(12) United States Patent
Huang et al.

(10) Patent No.: US 7,167,219 B2
(45) Date of Patent: Jan. 23, 2007

(54) ILLUMINATION MODULE RECEPTACLE WITH ELASTIC LIGHT SOURCE HOLDERS, ILLUMINATION MODULE WITH SAME, AND LIQUID CRYSTAL DISPLAY WITH SAME

(75) Inventors: Chung-Sung Huang, Miao-Li (TW); Sheng-Ming Wen, Miao-Li (TW)

(73) Assignees: Innocom Technology (Shenzhen) Co., Ltd., Shenzhen (CN); Innolux Display Corp., Miao-Li (TW)

( * ) Notice: Subject to any disclaimer, the term of this patent is extended or adjusted under 35 U.S.C. 154(b) by 138 days.

(21) Appl. No.: 10/867,985

(22) Filed: Jun. 14, 2004

(65) Prior Publication Data
US 2004/0263714 A1 Dec. 30, 2004

(30) Foreign Application Priority Data
Jun. 11, 2003 (TW) ................ 92115899 A

(51) Int. Cl.
*G02F 1/13357* (2006.01)
*F21S 4/00* (2006.01)

(52) U.S. Cl. ............... 349/60; 349/70; 362/225; 362/634; 248/50

(58) Field of Classification Search ............. 349/60, 349/67, 70, 71; 362/632–634, 225, 217, 362/29; 248/50
See application file for complete search history.

(56) References Cited

U.S. PATENT DOCUMENTS

| | | | | |
|---|---|---|---|---|
| 4,826,294 A | * | 5/1989 | Imoto | 349/67 |
| 6,330,150 B1 | | 12/2001 | Kim | |
| 6,388,722 B1 | * | 5/2002 | Yoshii et al. | 349/62 |
| 6,796,678 B1 | * | 9/2004 | Moon | 362/225 |
| 2003/0086264 A1 | * | 5/2003 | Huang | 362/250 |
| 2004/0156183 A1 | * | 8/2004 | Kim | 362/31 |

FOREIGN PATENT DOCUMENTS

JP 07270786 A * 10/1995

OTHER PUBLICATIONS

Machine translation of JP 07-270786.*

* cited by examiner

*Primary Examiner*—Andrew Schechter
(74) *Attorney, Agent, or Firm*—Wei Te Chung

(57) ABSTRACT

An illumination module (40) for emitting light beams includes a substrate (20) having a main inner surface (21), a plurality of pairs of holders (30) integrally formed on the surface and a plurality of linear light sources (40). Each holder defines a pair of adjoining slots (32, 33), each slot having a guiding portion (321, 331) and an adjoining retaining portion (322, 332). The retaining portions of each holder elastically hold one end of a corresponding linear light source.

15 Claims, 6 Drawing Sheets

ILLUMINATION MODULE RECEPTACLE WITH ELASTIC LIGHT SOURCE HOLDERS, ILLUMINATION MODULE WITH SAME, AND LIQUID CRYSTAL DISPLAY WITH SAME

BACKGROUND OF THE INVENTION

1. Field of the Invention

The invention generally relates to an illumination module for a liquid crystal display (LCD) device.

2. Prior Art

In general, an LCD device has the advantages of thinness, light weight, and low power consumption. For this reason, LCD devices are widely utilized in various types of electronic equipment, from pocket calculators to large-scale office automation equipment.

It is well known that the larger an LCD is, the more linear light sources must be provided therein to brightly light it. It is desirable that manufacturing of the large-scale LCDs be efficient, even though numerous light sources need to be incorporated into the LCDs. Each linear light source is generally a Cold Cathode Fluorescence Lamp (CCFL).

U.S. Pat. No. 6,330,150 issued to Soon-Dong Kim discloses a system for exchanging lamps of an LCD (see FIGS. 14 and 15). The system 100 includes a liquid crystal panel 13, a frame 12, and a plurality of lamps 17. A plurality of generally rectangular through holes 131 is defined in an upper beam of a frame of the liquid crystal panel 13. A rubber plate 18 is elastically attached on a lateral surface of a head portion of each lamp 17. The lamps 17 are inserted through the through holes 131, and engaged therein by elastic compression of the rubber plates 18 therein. In addition, each through hole 131 is bounded by an inwardly slanting slanted surface 132, so that the lamp 17 is easily inserted into the through hole 131. A connector 171 of the lamp 17 is electrically connected to a power system (not shown). When the lamps 17 are pulled out from through holes 131, the elastic force between the rubber plates 18 and the through holes 131 is released, thereby allowing replacement of the lamps 17.

Even though the system 100 enables exchanging of the lamps 17 of the LCD, the system 100 encounters some problems as follows:

First, the lamps 17 cannot be firmly engaged with the liquid crystal panel 13. According to the system 100 of the patent, the lamps 17 are engaged in the through holes 131 of the liquid crystal panel 13 only by means of the elastic force between the rubber plate 18 and the slanted surface 132 in the through hole 131. The elastic force between the rubber plate 18 and the slanted surface 132 is easily released by vibration or shock. Further, an end 172 of each lamp 17 is not secured, thus rendering the lamps 17 themselves unduly unstable.

Second, each lamp 17 is easily damaged, which can substantially increase the cost of the system 100. The lamps 17 may be removed from the liquid crystal panel 13 if they are damaged or broken due to an accident or wrong operation. In particular, the lamps 17 are liable to sustain shock during transportation of the LCD. In another embodiment of the system 100, a fixing solution using a screw is provided to secure the lamp 17. However, fixing the screw increases manufacturing time and costs. In addition, because the end 172 of each lamp 17 is not stable, there is an unduly high risk of damage to the lamps 17 when they are accidentally displaced from the liquid crystal panel 13. In general, each lamp 17 has a slim body with a small diameter in the range from 2 mm to 3 mm, and the main support of the lamp 17 is a hollow glass tube. Therefore, in manufacturing, the lamp 17 is easily broken when being inserting into or pulled out from the corresponding through hole 131 in oblique directions. In particular, the end 172 of may be broken when the lamp 17 is pressed into the through hole 131. These difficulties reduce the yield of the system 100 when exchanging of lamps 17 of the LCDs is required, which increases costs commensurately.

Third, each lamp 17 must be combined with the corresponding rubber plate 18 prior to installing the lamp 17 in the liquid crystal panel 13. That is, the rubber plate 18 has to be attached on the lateral surface of the head portion of the lamp 17 before attaching the combination in the liquid crystal panel 13. This increases a manufacturing time and costs of the system 100.

SUMMARY OF THE INVENTION

An object of the present invention is to provide an illumination module that has high mechanical performance, is easy to manufacture, and has low costs.

According to one aspect of the present invention, an illumination module in accordance with the present invention comprises a substrate having a main inner surface, a plurality of pairs of holders integrally formed on the surface, and a plurality of linear light sources. Each holder defines a pair of adjoining slots, each slot having a guiding portion and an adjoining retaining portion. The retaining portions of each holder elastically hold one end of a corresponding linear light source.

Other objects, advantages, and novel features of the present invention will become more apparent from the following detailed description when taken in conjunction with the accompanying drawings.

DESCRIPTION OF THE PREFERRED EMBODIMENTS

Figure 1:
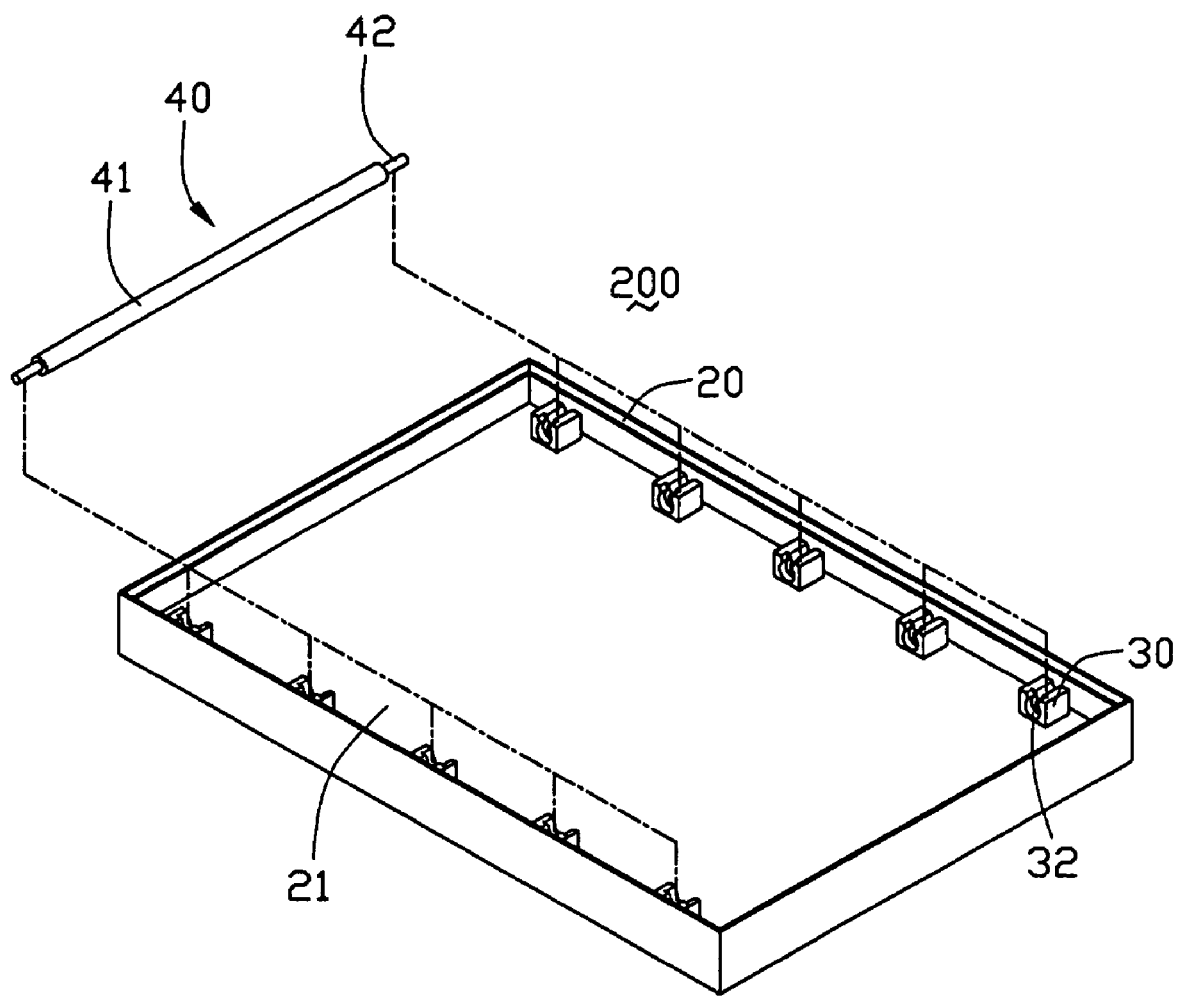
FIG. 1 is an exploded, isometric view of a preferred first embodiment of an illumination module according to the present invention, but showing only linear light source thereof.

Referring to FIG. 1, a preferred first embodiment of an illumination module 200 according to the present invention includes at least a linear light source 40 and a substrate 20 that is shaped like a box-like frame. The substrate 20 functions as a receptacle of the illumination module 200, for accommodating the linear light sources 40 therein. The substrate 20 has a main inner surface 21, and at least a pair of spaced apart holders 30 integrally formed with the inner surface 21. In the illustrated embodiment, there are five pairs of holders 30 and one of five corresponding linear light sources 40. The holders 30 are made from elastic material, such as silicon rubber. Each holder 30 defines a second slot 32 and an adjoining first slot 33, for the elastic holding of one end of a respective linear light source 40. That is, each pair of holders 30 elastically holds the respective linear light source 40.

Each linear light source 40 has a main body 41, and two electrodes 42 extending respectively from two opposite ends of the main body 41. A diameter of each electrode 42 is less than a diameter of the main body 41. A power source (not shown) connects to the electrodes 42, for providing power to the light sources 40.

Figure 2:
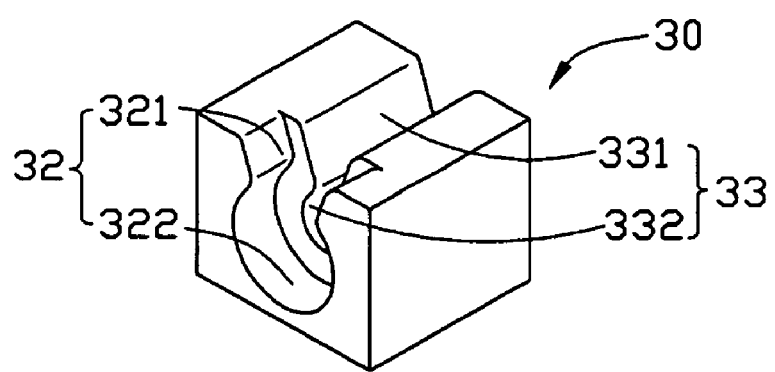
FIG. 2 is an enlarged, perspective view of one holder of the illumination module of FIG. 1.
Figure 3:
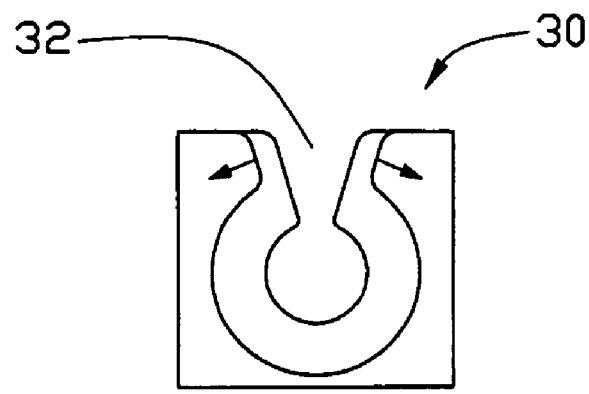
FIG. 3 is a side elevation of the holder of FIG. 2.

Referring to FIGS. 2 and 3, the holder 30 has a rectangular profile, and the second slot 32 has a keyhole-shaped configuration. The second slot 32 comprises a flared second guiding portion 321, and an adjoining second retaining portion 322. The second retaining portion 322 has a generally circular profile. All widths of the second guiding portion 321 are less than the corresponding diameter of the main body 41 of the respective linear light source 40. A diameter of the second retaining portion 322 is substantially the same as or less than the diameter of the main body 41. The first slot 33 has a keyhole-shaped configuration. The first slot 33 comprises a flared first guiding portion 331, and an adjoining first retaining portion 332. The first retaining portion 332 has a generally circular profile. All widths of the first guiding portion 331 are less than the diameter of the corresponding electrode 42 of the linear light source 40. A diameter of the first retaining portion 332 is substantially the same as or less than the diameter of the electrode 42.

Figure 4:
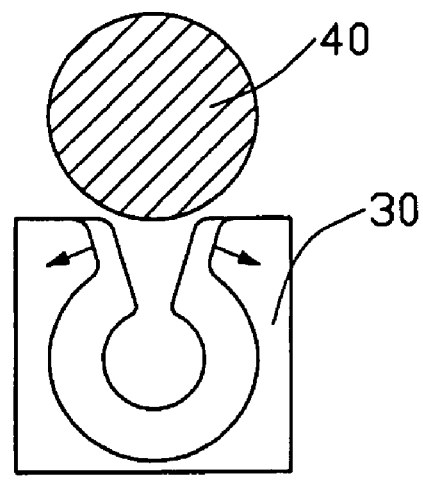
FIG. 4 is similar to FIG. 3, but showing the linear light source in cross-section ready to be received in the holder.
Figure 5:
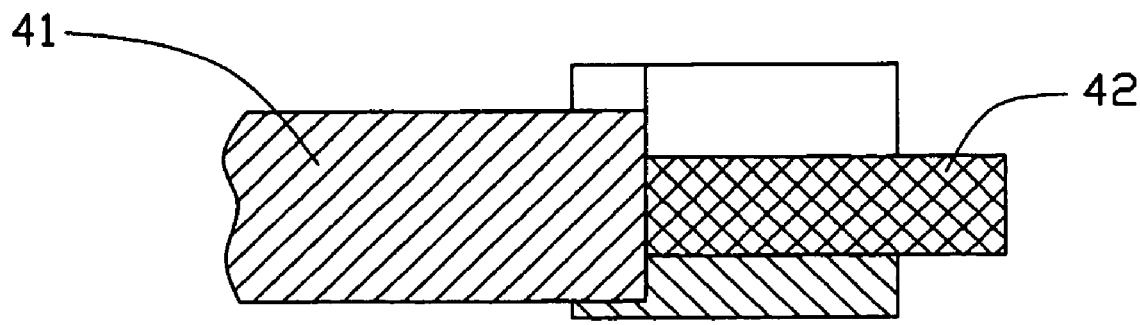
FIG. 5 is a cross-sectional view of the holder of FIG. 4 having the linear light source received therein.

Referring to FIGS. 4 and 5, in assembly of the illumination module 200, the main body 41 and the electrode 42 of one end of each linear light source 40 are pressed down into the second slot 32 and the first slot 33 of the corresponding holder 30 via the second guiding portion 321 and the first guiding portion 331 respectively. The main body 41 and the electrode 42 elastically deform the holder 30 in directions shown in FIGS. 3 and 4, so that the main body 41 and the electrode 42 are easily received in the second retaining portion 322 and the first retaining portion 332 respectively. Then, the holder 30 elastically rebounds so that said end of the linear light source 40 is securely retained in the holder 30. In particular, because the diameters of the second retaining portion 322 and the first retaining portion 332 are substantially the same as or less than the diameters of the main body 41 and the electrode 42 respectively, the holder 30 can maintain elastic compression around said end of the linear light source 40. Furthermore, because all widths of the second guiding portion 321 and all widths of the first guiding portion 331 are less than the diameters of the main body 41 and the electrode 42 respectively, the linear light source 40 is prevented from being accidentally detached from the holder. Moreover, a step portion of the holder 30 where the second retaining portion 322 adjoins the second retaining portion 332 functions as a stop to limit horizontal movement of the main body 41. Therefore, the two ends of the linear light source 40 are firmly held between the pair of corresponding holders 30. Finally, because the main body 41 and the electrodes 42 are easily received in the second retaining portions 322 and the first retaining portions 332 of the holders 30, assembly of the illumination module 200 is convenient and speedy.

Figure 6:
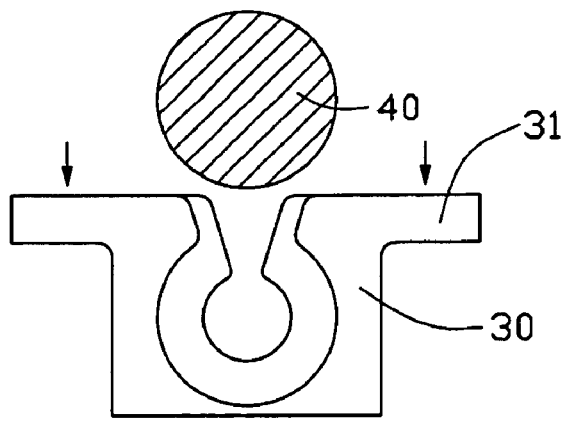
FIG. 6 is similar to FIG. 4, but showing a preferred second embodiment of any one holder of the illumination module according to the present invention.

Referring to FIG. 6, a pair of wings 31 may be provided on two sides of the holder 30 respectively. The second guiding portion 321 of the second slot 32 and the first guiding portion 331 of the first slot 33 can be opened by exerting forces on the wings 31 in the directions shown. This enables the linear light source 40 to be easily received in the holder 30.

Figure 7:
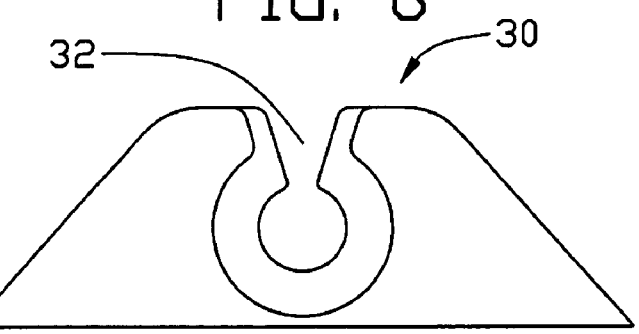
FIG. 7 is similar to FIG. 3, but showing a preferred third embodiment of any one holder of the illumination module according to the present invention.
Figure 8:
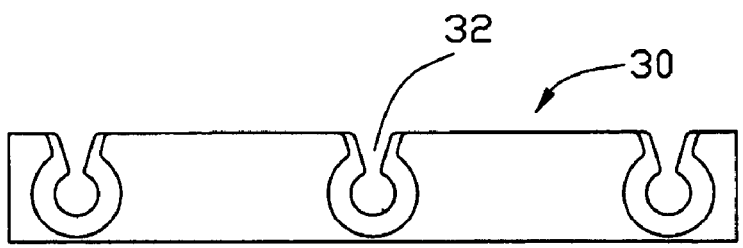
FIG. 8 is similar to FIG. 3, but showing a preferred fourth embodiment of holders of the illumination module according to the present invention.
Figure 9:
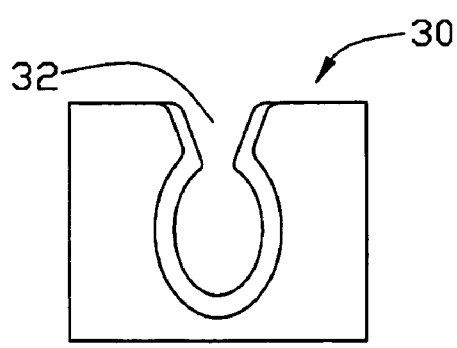
FIG. 9 is similar to FIG. 3, but showing a preferred fifth embodiment of any one holder of the illumination module according to the present invention.
Figure 10:
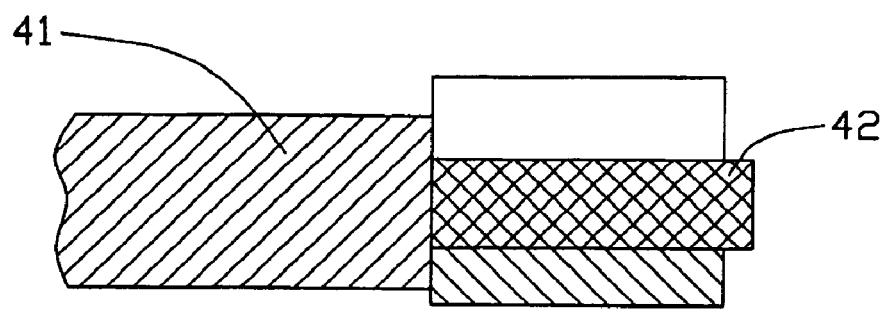
FIG. 10 is similar to FIG. 5, but showing a preferred sixth embodiment of any one holder of the illumination module according to the present invention.

Referring to FIG. 7, the profile of the holder 30 may alternatively be trapezoidal. This provides more elastic force for the holder 30 to retain the linear light source 40 therein. Referring to FIG. 8, the holders 30 at either or both of long sides of the substrate 20 may alternatively be integrally formed together as parts of a long body. This not only provides more elastic force for the holders 30 to retain the linear light sources 40 therein, but also simplifies manufacturing of the illumination module 200. Referring to FIG. 9, the profiles of the second retaining portion 322 and the first retaining portion 332 may alternatively each be generally elliptical. Furthermore, the profiles of the second retaining portion 322 and the first retaining portion 332 may alternatively each be generally elliptical but with an arris (not shown in the FIGS.). Referring to FIG. 10, the second slot 32 may alternatively be omitted. The holder 30 only defines a longer first slot 33 (not labeled). The first slot 33 receives the electrode 42 of the linear light source 40, and a corresponding side face of the holder 30 functions as a stop to limit horizontal movement of the linear light source 40.

With the above-described structure of the illumination module 200, each pair of holders 30 firmly retains the corresponding linear light source 40 therebetween. The linear light source 40 is prevented from being accidentally detached from the holders 30. In addition, when assembling the illumination module 200, the linear light source 40 can be quickly and safely engaged in the holders 30. Similarly, the linear light source 40 can be quickly and safely removed from the holders 30. Furthermore, unlike in conventional illumination modules, no rubber plates need to be attached to the linear light source 40. Thus, the illumination module 200 provides good mechanical performance, easy manufacturing and assembly, and reduced costs.

Figure 11:
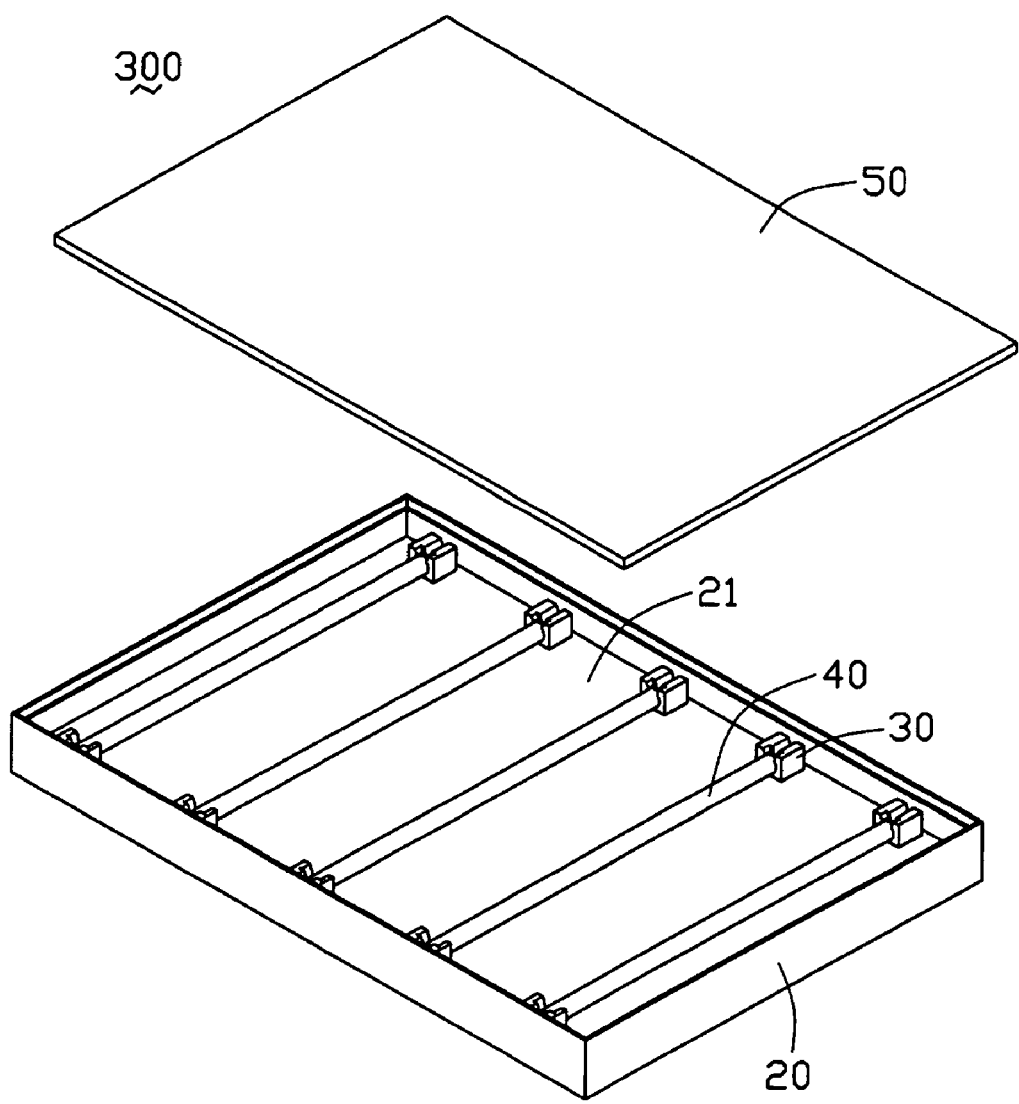
FIG. 11 is an exploded, isometric view of a first embodiment of an LCD according to the present invention.

Referring to FIG. 11, a preferred first embodiment of a liquid crystal display 300 in accordance with the present invention includes a liquid crystal panel 50 attached on the illumination module 200. The illumination module 200 comprises the substrate 20, the holders 30 and the linear light sources 40. The substrate 20 has the inner surface 21. The holders 30 are integrally formed on the inner surface 21 of the substrate 20. The linear light sources 40 are disposed between the inner surface 21 and the liquid crystal panel 50.

Each holder 30 includes the second slot 32 and the first slot 33. The holders 30 elastically retain the linear light sources 40 therebetween.

Figure 12:
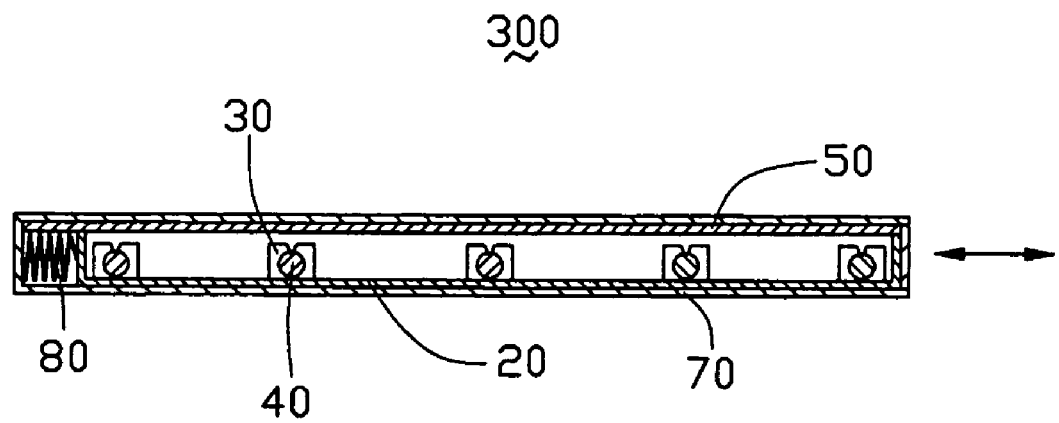
FIG. 12 is a schematic, cross-sectional view of a second embodiment of the LCD according to the present invention.

Referring to FIG. 12, a preferred second embodiment of the liquid crystal display 300 in accordance with the present invention includes a housing 70 receiving the liquid crystal panel 50 and the illumination module 200. An elastic unit 80 is attached to one inner side surface of the housing 70, the elastic unit 80 elastically urging against one side of the liquid crystal panel 50. An openable cover (not shown) is provided at an opposite side of the housing 70. The liquid crystal panel 50 and/or the substrate 20 can be easily removed from the housing 70 and put back into the housing 70, with the elastic unit 80 expanding and being compressed in the directions shown. This enables easy replacement of any of the linear light sources 40.

Figure 13:
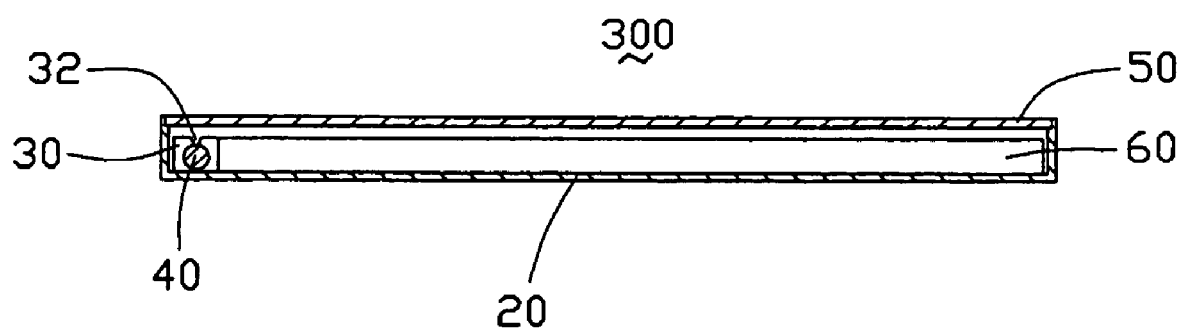
FIG. 13 is a schematic, cross-sectional view of a third embodiment of the LCD according to the present invention.
Figure 14:
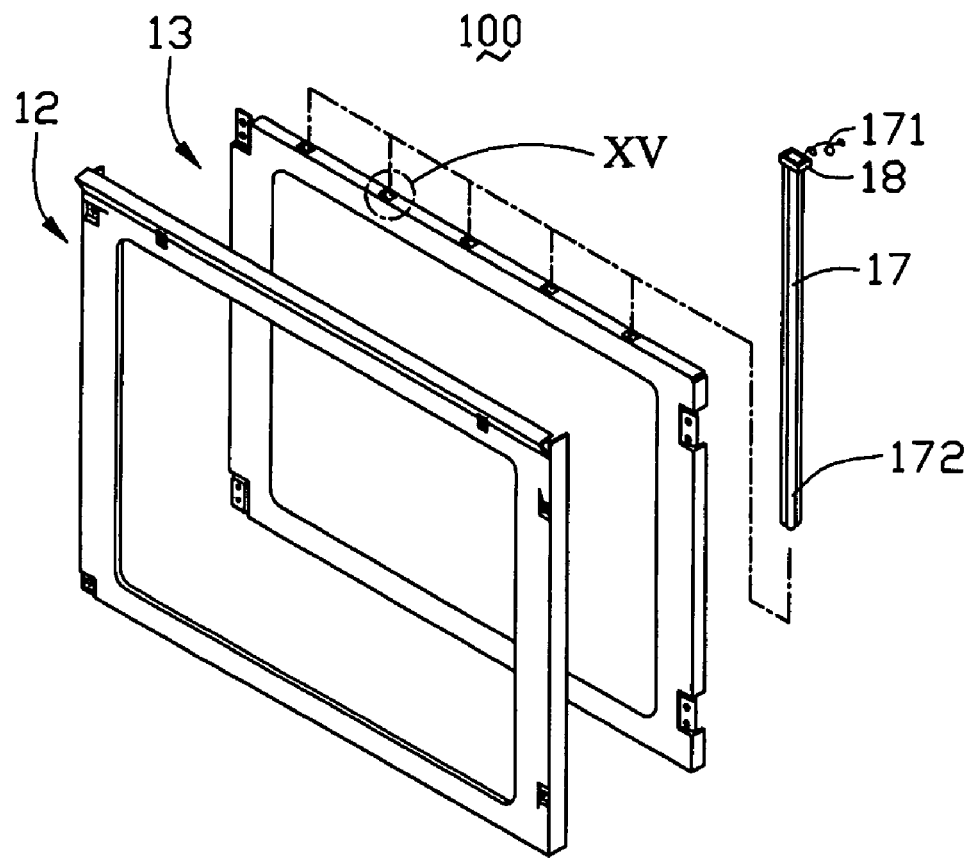
FIG. 14 is an exploded, isometric view of a conventional LCD.
Figure 15:
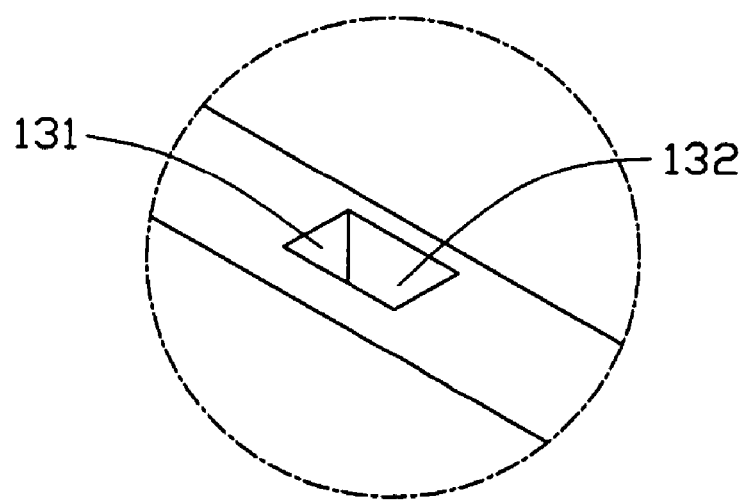
FIG. 15 is an enlarged view of a circled portion XV of FIG. 14.

Referring to FIG. 13, a preferred third embodiment of the liquid crystal display 300 in accordance with the present invention includes the liquid crystal panel 50 and a modified version of the illumination module 200. A light guide plate 60 is located between the substrate 20 of the illumination module 200 and the liquid crystal panel 50. A pair of the holders 30 is integrally formed with the inner surface 21 of the substrate 20 at one end thereof, corresponding to one side of the light guide plate 60. A linear light source 40 retained by the holders 30 emits light. The light enters the light guide plate 50 and is guided to uniformly illuminate the liquid crystal panel 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention of claimed is:

1. An illumination module for emitting light beams, comprising:
   a substrate having a main surface;
   a pair of holders integrally formed with the surface of the substrate; and
   a linear light source, comprising a main body and two electrodes extending respectively from two opposite ends of the main body, a diameter of each of the electrodes being less than a diameter of the main body;
   wherein each of the holders defines a first slot having a first guiding portion and an adjoining first retaining portion, the first retaining portion elastically holding a corresponding one of the electrodes of the linear light source, a diameter of the first retaining portion being substantially the same as or less than the diameter of the corresponding electrode, and a width of the first guiding portion being less than the diameter of the corresponding electrode.

2. The illumination module as claimed in claim 1, wherein each of the holders has a rectangular profile, and the first slot of the holder has a keyhole-shaped configuration.

3. The illumination module as claimed in claim 1, wherein the first guiding portion of the first slot is flared, and the first retaining portion of the first slot has a generally circular profile.

4. The illumination module as claimed in claim 1, wherein each of the holders further defines a second slot adjoining the first slot, and the second slot has a flared second guiding portion and an adjoining second retaining portion.

5. The illumination module as claimed in claim 4, wherein a diameter of the second retaining portion is substantially the same as or less than the diameter of the main body of the liner light source, and a width of the second guiding portion is less than the diameter of the main body.

6. The illumination module as claimed in claim 4, wherein the diameter of the second retaining portion of the second slot is larger than the diameter of the first retaining portion of the first slot.

7. The illumination module as claimed in claim 4, wherein a profile of each the first retaining portion and the second retaining portion is generally elliptical, or generally elliptical but with an arris.

8. The illumination module as claimed in claim 1, wherein the substrate defines a receptacle of the illumination module.

9. The illumination module as claimed in claim 1, wherein the holder has a pair of wings provided on opposite sides thereof respectively.

10. The illumination module as claimed in claim 1, wherein each of the holders has a trapezoidal profile.

11. The illumination module as claimed in claim 1, comprising a plurality of pairs of the holders, the holders at each of opposite sides of the main surface being integrally formed together as parts of a single body.

12. An illumination module receptacle for accommodating a plurality of linear light sources, each linear light source including two electrodes extending from two opposite ends thereof respectively, the illumination module receptacle comprising:
    a substrate having a main surface; and
    a plurality of pairs of holders integrally formed with the surface of the substrate;
    wherein each of the holders defines a slot having a guiding portion and an adjoining retaining portion, for elastically holding a corresponding electrode of a corresponding linear light source, a diameter of the retaining portion being substantially the same as or less than a source, and a width of the guiding portion being less than the diameter of the corresponding electrode of the corresponding linear light source.

13. A liquid crystal display comprising:
    a liquid crystal panel; and
    an illumination module for emitting light beams to the liquid crystal panel, the illumination module comprising:
    a substrate having a main surface, the substrate being attached on the liquid crystal panel; and
    a pair of holders integrally formed with the surface of the substrate; and
    a linear light source disposed between the substrate and the liquid crystal panel, the liner light source comprising a main body and two electrodes extending from two opposite ends thereof respectively, a diameter of each of the electrodes being less than a diameter of the main body;
    wherein each of the holders defines a slot having a guiding portion and an adjoining retaining portion, for elastically holding a corresponding one of the electrodes of the linear light sources, a diameter of the retaining portion being substantially the same as or less than the diameter of the corresponding electrode, and a width of the guiding portion being less than the diameter of the corresponding electrode.

14. The liquid crystal display as claimed in claim 13, further comprising a housing receiving the liquid crystal panel and the substrate, an elastic unit attached inside of the housing and elastically urging against one side of the liquid crystal panel, and an openable cover at a side of the housing distal from the elastic unit.

15. The liquid crystal display as claimed in claim 13, further comprising a light guide plate located between the substrate and the liquid crystal panel, the holders being disposed at one end of the substrate and corresponding to one side of the light guide plate.

* * * * *